Patented Sept. 16, 1924.

1,509,035

UNITED STATES PATENT OFFICE.

FRED CURTIS THORNLEY AND FRANK FORD TAPPING, OF KNIGHTSBRIDGE, LONDON, AND OTTO REYNARD, OF INKERMAN TERRACE, LONDON, ENGLAND; SAID TAPPING AND SAID REYNARD ASSIGNORS TO SAID THORNLEY.

PROCESS FOR THE UTILIZATION OF SEAWEED.

No Drawing.   Application filed December 10, 1923. Serial No. 679,756.

*To all whom it may concern:*

Be it known that we, FRED CURTIS THORNLEY, FRANK FORD TAPPING, and OTTO REYNARD, all subjects of the King of Great Britain, and residing, respectively, at Hyde Park Hotel, Knightsbridge, in the county of London, England; Hyde Park Hotel, Knightsbridge, in the county of London, England, and 8 Inkerman Terrace, in the county of London, England, have invented certain new and useful Improvements in a Process for the Utilization of Seaweed, on which we have filed an application in Great Britain, No. 22644, dated August 19, 1922, of which the following is a specification.

The subject of this invention is a process for the utilization of seaweed by converting same into a colloidal pulp while in a fresh condition, the said process being of a simple nature and adapted to be used at the place of collection of the seaweed, thus avoiding not only the transport of relatively large quantities but also the difficulties arising from the rapid decomposition or fermentation of seaweed when stacked or piled in masses.

According to this invention the seaweed is macerated, ground to a degree of colloidal fineness and mixed with a small proportion of water-soluble alkaline materials, or alternatively with the oxide, hydroxide, or carbonate of an alkaline earth or heavy metal, whereby a pulp or stable emulsion is formed. Chemical inter-action is by this fine grinding allowed to take place between the alginic acid present in a seaweed and the metallic substance added, without extended application of heat, which would tend to the decomposition of both the cellulose and the alginic constituents. This emulsion may consist of cellulose suspended in a solution or jelly of a soluble alginate, the cellulose acting as a protective colloid, such solution containing all the salts originally present in the seaweed, or may when lime is present contain cellulose mixed with insoluble alginate, this mixture being in suspension in an aqueous solution of the salts originally present in the seaweed. The algin constituent and the cellulose constituent thus remain in the pulp in their original proportions and can be used conjointly for technical purposes. The alkaline material preferred is either sodium carbonate or sodium hydrate in the proportion of 1 to 2 per cent; similar quantities of potassium carbonate or potassium hydrate would answer equally well technically, but at the present time would be more expensive. 1½ to 2½ per cent of calcium or magnesium oxide or hydrate might be used instead of the sodium carbonate or hydrate. Cupric oxide in the proportion of 2 per cent would answer for some purposes, as also would lead oxide in the proportion of 4 per cent, but for other purposes these would be less suitable than the material previously mentioned, and stannic oxide would be quite unsuitable. The said pulp serves as an agglutinant, binding or bonding material to be used directly either alone or in conjunction with other suitable substances for constructive or other purposes. It may for example be used for briquetting powdered fuel, for binding leather clippings and other waste products, for use with asbestos as a heat insulating material, and for many other purposes, this combination of finely divided cellulose suspended in an alginate solution possessing greater binding power than alginate solutions alone.

The seaweed treated may be *Laminaria stenophylla*, *Laminaria digitata*, *Sargassum bacciferum*, or the like. A preliminary maceration or pressing with filtration may in some cases be found desirable to evacuate the sea water mechanically entrained with the seaweed.

At any stage in the preparation of the pulp, a small amount of preservative may be added, such as salicyclic acid, or a salicylate, a phenol or phenate, formaldehyde or other well-known material commonly employed to inhibit fermentation or putrefaction.

As in some cases the presence in the pulp of an excess of soluble material is objectionable, the following process may in such cases be employed:—

The seaweed, after leaching in cold or warm water, is agitated in water for not less than half an hour or preferably for an hour. It is then freed as far as possible from fluid matter by filteration and pressing, but may still contain 30 or 40 per cent of added water. It is then finely ground in a suitable machine until a smooth or impalpable pulp is produced. Machines suitable for carrying out such grinding may be for example disc mills, "colloidal mills" or of other known type. By means of this extremely fine grinding, the algin constituent of the seaweed assumes a form in which it is chemically active at ordinary temperatures, in a manner which would not be realized for example in a process in which ordinarily ground weed is mixed with chemical reagents such as milk of lime, which in previous processes was used merely as a clarifying agent with the object of separating the juices from the fibrous part of the seaweed. Although the alkaline substance previously mentioned may be added to the pulp before or during the grinding operation, it may be preferred to add it after the fine pulp comes from the mill, especially when ammonia liquid is the alkaline material employed. Assuming that 280 lbs. of pulp (containing 200 lbs. of seaweed) are being treated, 10 lbs. of ammonia liquor (containing 2 lbs. of ammonia) can be added to the pulp, and any excess of ammonia boiled off. From this quantity of pulp 20 lbs. of solids may be obtained of which 4 lbs. is alginic acid. When sodium carbonate is the alkali used, as any excess cannot be readily driven off, the quantity of sodium should not exceed 1 part per 1000 of the pulp, or say 2.5 parts of anhydrous sodium carbonate per 1000. Some of the salts in the seaweed, such as salts of potassium and iodine, which are eliminated in boiling, can be recovered from the liquor drained off after boiling by known processes of settling, filtering and evaporating.

The pulp produced by this latter method may be concentrated by evaporation, and when ammonia or an insoluble alkaline earth compound has been used in its manufacture, will not contain any soluble material other than the ammonium or magnesium compound of alginic acid. It is considered however that boiling the weed preparatory to grinding is essential if soluble matter is to be eliminated as far as possible, but is optional in other cases, while maceration and fine grinding are essential in all cases.

What we claim and desire to secure by Letters Patent of the United States is:—

1. A cold process of preparing an agglutinating pulp from fresh seaweed containing the constituents in substantially the original proportions, which consists in converting the alginic acid present in the seaweed to alginate by macerating and grinding the seaweed to a condition of colloidal fineness, and treating the same in such condition with a small proportion of alkali material, so that the said conversion occurs without application of heat.

2. A cold process of preparing a pulp from fresh seaweed containing unchanged cellulose and modified alginic acid in substantially the original proportions, which consists in converting the alginic acid present in the seaweed to alginate by macerating and grinding the seaweed to a condition of colloidal fineness, and treating the same in such condition with a small proportion of alkali material, so that the said conversion occurs without application of heat.

3. The method of preparing colloidal suspension of cellulose from fresh seaweed with the use of a metal alginate as peptizing agent produced from the alginic acid of the material, by macerating and grinding the seaweed to a condition of colloidal fineness and treating the same with a small quantity of alkali material, which consists in performing the operation at a temperature insufficient to cause chemical modification of the cellulose and the alginic acid radical present in the seaweed.

4. A pulp for use as a binding or agglomerating agent comprising finely divided cellulose having its fibrous structure substantially destroyed suspended in a solution of an alginate, prepared substantially as described and claimed in claim 2.

5. A pulp for use as a binding or agglomerating agent comprising finely divided cellulose having its fibrous structure substantially destroyed suspended in water and associated with an insoluble alginate, prepared substantially as described and claimed in claim 2.

FRED CURTIS THORNLEY.
FRANK FORD TAPPING.
OTTO REYNARD.